A. L. EUSTIS.
SHUT-OFF AND SAFETY VALVE.
APPLICATION FILED APR. 20, 1920.

1,405,192.

Patented Jan. 31, 1922.

INVENTOR.
A. L. Eustis,
BY Hazard & Miller
ATTORNEYS.

UNITED STATES PATENT OFFICE.

ARTHUR L. EUSTIS, OF LOS ANGELES, CALIFORNIA.

SHUT-OFF AND SAFETY VALVE.

1,405,192.  Specification of Letters Patent.  Patented Jan. 31, 1922.

Application filed April 20, 1920. Serial No. 375,363.

*To all whom it may concern:*

Be it known that I, ARTHUR L. EUSTIS, a citizen of the United States, residing at Los Angeles, in the county of Los Angeles and State of California, have invented new and useful Improvements in Shut-Off and Safety Valves, of which the following is a specification.

My object is to make a shut-off and safety valve, and my invention consists of the novel features herein shown, described and claimed.

Figure 2:
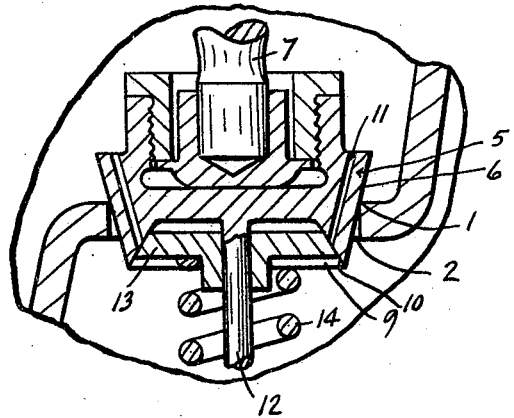
Fig. 2 is an enlarged fragmentary sectional detail of the safety valve construction shown in Fig. 1.
Figure 1:
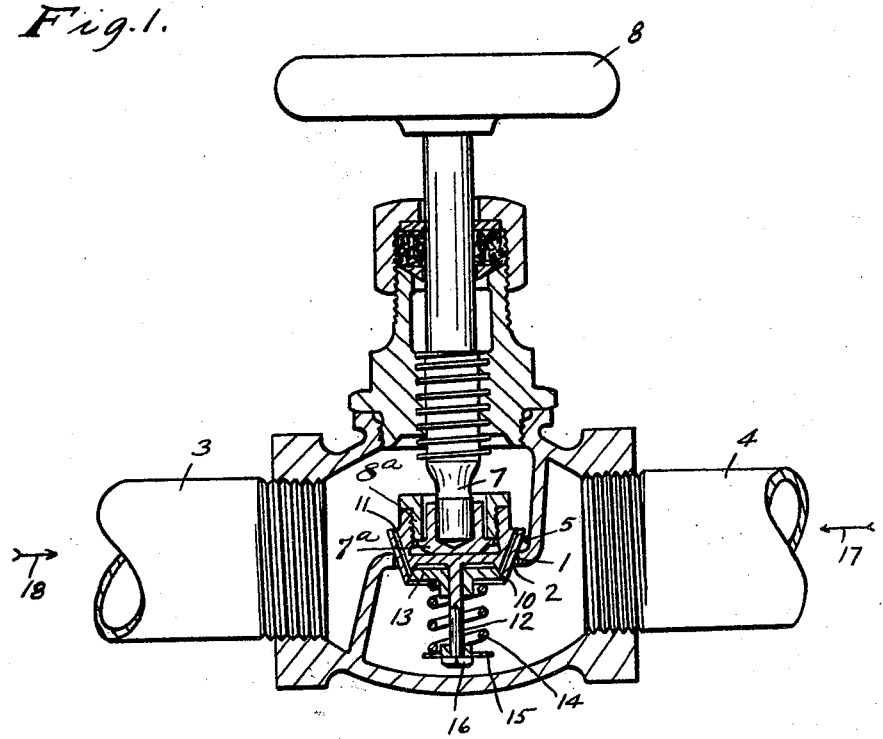
Figure 1 is a vertical central section showing a safety valve embodying the principles of my invention connecting two pipes, the pipes being broken away.

I have shown the invention applied to a globe valve.

The valve seat 1 has the usual opening 2 crosswise of the axes of the pipes 3 and 4. The valve plug 5 has a tapered face 6 adapted to engage the seat 1 and close the opening 2. The valve plug 5 is connected to the valve stem 7 in the usual way to be operated by the handle 8, as by pressing flange 7ª upon the end of stem 7 and receiving said flange beneath a shoulder formed by sleeve 8ª threaded into plug 5.

A recess 9 is formed in the lower face of the valve plug 5 and the recess 9 is finished to form the beveled seat 10. Relief ports 11 extend through the valve plug 5 from its upper face to the seat 10. A stem 12 extends from the plug 5 downwardly at the center of the recess 9 and concentric to the seat 10. A check valve 13 fits slidingly upon the stem 12 against the seat 10, so that when the check valve 13 is seated the ports 11 are closed. An expansive coil spring 14 fits around the stem 12 against the check valve 13. A spring seat 15 fits upon the lower end of the stem 12 against the spring 14, and a nut 16 is screwed upon the stem against the spring seat 15. The tension of the spring 14 is exerted to hold the check valve closed and determine the pressure at which the check valve will yield.

When the pressure coming through the ports 11 against the check valve 13 overcomes the tension of the spring 14 the check valve 13 will be unseated and the pressure relieved.

The uses and advantages are obvious. For instance, the valve may be incorporated into a pipe line to feed water to a range boiler and when the range boiler has been filled to the desired extent the main valve may be operated to stop the flow of water into the range boiler; then if the flow of water to the boiler is in the direction indicated by the arrow 17 the flow of water will be in the same direction as the tension of the spring 14, and when the main valve 5 is seated the flow of water will be shut off; then if the range boiler becomes overheated the back pressure will be in the direction indicated by the arrow 18 and will pass through the ports 11 to the check valve 13 and unseat the check valve and relieve the surplus pressure.

Thus I have produced a manually operated cut-off valve adapted to open and allow liquid to flow inwardly and adapted to close and stop the inflow of liquid, the cut-off valve carrying a spring actuated check valve adapted to stop the inflow of liquid and adapted to yield under the outflow of an excess pressure.

Various changes may be made without departing from the spirit of my invention as claimed.

I claim:

A cut-off valve having a valve seat and a co-operating valve head, said valve head having relief ports extending through the same and a recess in its lower face forming a check valve seat with said ports leading to the check valve seat, a rod depending from said valve head, a check valve thereon and fitting the check valve seat, and a spring upon said rod beneath said check valve for yieldably seating the latter.

In testimony whereof I have signed my name to this specification.

ARTHUR L. EUSTIS.